(12) United States Patent
Moorthy et al.

(10) Patent No.: US 7,930,687 B2
(45) Date of Patent: Apr. 19, 2011

(54) EXECUTION CONTEXT INFRASTRUCTURE

(75) Inventors: Arun Moorthy, Seattle, WA (US); Christopher W. Brumme, Mercer Island, WA (US); Jonathan C. Hawkins, Seattle, WA (US); Raja Krishnaswamy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 12/277,180

(22) Filed: Nov. 24, 2008

(65) Prior Publication Data

US 2009/0077573 A1    Mar. 19, 2009

Related U.S. Application Data

(63) Continuation of application No. 10/959,812, filed on Oct. 6, 2004, now Pat. No. 7,458,072.

(51) Int. Cl.
*G06F 9/45* (2006.01)
*G06F 9/44* (2006.01)

(52) U.S. Cl. .................. 717/157; 717/154; 717/106

(58) Field of Classification Search ............ 717/157, 717/154, 106; 719/315, 316
See application file for complete search history.

(56) References Cited

U.S. PATENT DOCUMENTS 6,907,608 B1 * 6/2005 Susser et al. .............. 719/315
* cited by examiner

*Primary Examiner* — Wei Y Zhen
*Assistant Examiner* — Qamrun Nahar
(74) *Attorney, Agent, or Firm* — Lee & Hayes, PLLC

(57) ABSTRACT

Described herein is an implementation for exposing an "execution context" to a logical execution flow of procedures as it executes. An "execution context" is a set of data and/or sub-procedures that might be useful at some point during a logical execution flow (to manage and control the execution flow and provide additional services to the execution flow) of computer-executable instructions though the often complex, intertwined, and interconnected conglomeration of procedures of software product(s).

20 Claims, 3 Drawing Sheets

EXECUTION CONTEXT INFRASTRUCTURE

RELATED APPLICATION

This application is a continuation of and claims priority to U.S. patent application Ser. No. 10/959,812, filed on Oct. 6, 2004, the disclosure of which is incorporated by reference herein.

Any disclaimer that may have occurred during the prosecution of the above-referenced application is hereby expressly rescinded, and reconsideration of all relevant art is respectfully requested.

TECHNICAL FIELD

This invention generally relates to a technology that enhances and improves the development of executable software products and the execution of the instructions of such software products.

BACKGROUND

Instead of a monolithic product, modern executable software is typically a dynamic collection of a multitude of independent and often interrelated computer-executable program modules. These modules are executable procedures (e.g., routines) which perform one or more defined functions. In the complex, intertwined, and interconnected conglomeration of executable procedures, procedures call each other. For example, one procedure calls another which calls two more which calls another and another and two more and so forth.

Each procedure typically has a set of input values. One of the most common ways for a procedure to acquire its input values is via arguments (i.e., parameters) passed along to it when it is called.

For example, consider the following procedure calls and the defined syntax to call them:

PROC1 (a, b)
PROC2 (a, b)
PROC3 (a, b, c, d)

where the upper-case name (e.g., PROC1) represents the name of the procedure and the lower-case letters in parenthesis represents arguments passed to those procedures when they are invoked. For this example, assuming that all specified values of all specified arguments are necessary for that procedure's functionality and the procedure calling it does not produce that value.

When PROC1 calls PROC2, PROC1 is able to supply the values for "a" and "b" since they were supplied when PROC1 was called. However, when PROC2 subsequently calls PROC3, there is a problem. PROC2 does not have a value for "c" or "d" (because it did not get those values from PROC1 when it was called).

As illustrated by the example, the problem is how to best access a set of data (and, perhaps, sub-procedures) that might be useful at some point during a logical execution flow though the complex, intertwined, and interconnected conglomeration of executable procedures of modern software product(s).

One traditional approach is to solving this problem is to modify the calling definitions of procedures to include currently useless arguments that may be useful later if other procedures that use those arguments are called.

Using the above example, the procedure invocation definitions might be changed to this [the added arguments being italicized]:

PROC1 (a, b, c, d)
PROC2 (a, b, c, d)
PROC3 (a, b, c, d)

The definitions of PROC1 and PROC2 are changed here so that they now include arguments "c" and "d." While these newly supplied arguments are unnecessary for PROC1 and PROC2, they are necessary for PROC3.

The primary drawback to this approach is that one small change causes a ripple effect of definitional changes across the "ocean" of currently defined procedures. In other words, the simple addition of one new procedure (or added feature to an existing procedure) forces a redefinition of the procedure calls for all of the procedures which might ever be in the execution chain of those that might ever call this new procedure (or the altered existing one). In some cases there might a new procedure-1 that calls another new procedure-2 that requires additional information, but the actual call from procedure-1 might have pass through a series of existing old procedures before reaching procedure-2, and it may not be possible to change these existing procedures to add these extra arguments due to various reasons, for example there might be other callers of these existing procedures that will break if new arguments are added.

Another traditional approach to solving this problem is to utilize global variable definitions, which are accessible by a global set of procedures. Global variables are used here to avoid having to pass frequently-used variables continuously throughout a chain of called procedures.

In computer programming, a global variable is a variable that does not belong to any procedure in particular and can therefore be accessed from any procedure (within a defined group). Thus use of global variable allows for flexibility.

However, generally speaking, use of global variables is considered bad practice. A global variable can potentially be modified from anywhere. This allows for unexpected results. Also, because any part of an executable program may depend on the global variable, there is an unlimited potential for creating mutual dependencies. Adding mutual dependencies increases complexity.

Furthermore, global variable may not be accessible across the full scope of procedures executed along the logical execution path. For example, the one set of global variable may be accessible by set of procedures of a given application, but they might not be global (and thus be inaccessible) to another set of procedures of the operating system or another application.

These conventional solutions to this problem are widely used, but, as shown above, they each have drawbacks.

SUMMARY

Described herein is an implementation for exposing an "execution context" to a logical execution flow of procedures as it executes. An "execution context" is a set of data and/or sub-procedures that might be useful at some point during a logical execution flow of computer-executable instructions though the often complex, intertwined, and interconnected conglomeration of procedures of software product(s).

BRIEF DESCRIPTION OF THE DRAWINGS

The same numbers are used throughout the drawings to reference like elements and features.

DETAILED DESCRIPTION

Figure 1:
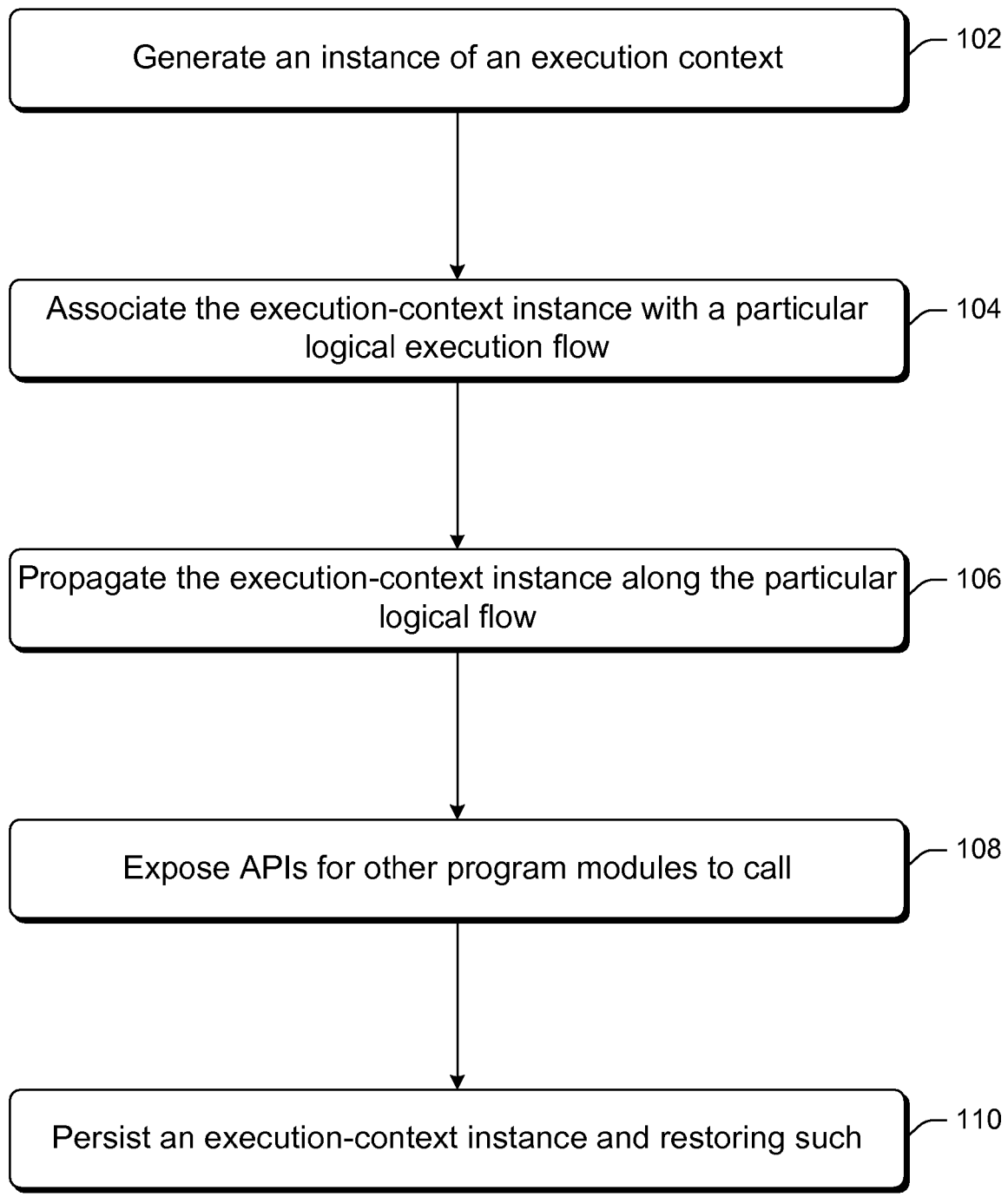
FIG. 1 shows a flow diagram showing a methodological implementation described herein.

The following description sets forth techniques for a logical execution flow of procedures to share an "execution context" associated therewith. An exemplary implementation of these techniques may be referred to as an "exemplary execution context infrastructure."

The techniques may be implemented in many ways, including (but not limited to) program modules, general- and special-purpose computing systems, network servers and equipment, dedicated electronics and hardware, and as part of one or more computer networks. The techniques may be implemented, for example, be implemented on a computer system depicted in FIG. 3.

Herein, implementations are described in the context of a cross-platform run-time environment—common language runtime (CLR), in particular. Other implementations may utilize other cross-platform run-time environment or virtual execution systems (VES). Other implementations may use traditional programming environments, such as those of complied and interpreted languages.

For more on CLR and its associated terminology, please see a section titled "Common Language Runtime (CLR)" below on page 22 and relevant explanatory material found on the MSDN™ Library.

Exemplary Execution Context Infrastructure

An instance of a class generated in accordance with the exemplary execution context infrastructure, as described herein, is an ambient set of data and procedures configured for association with a particular logical execution flow so that procedures along an associated logical execution flow have access to the set of data without receiving the set of data when the procedures are invoked. It may also include an ambient set of procedures facilitating management of the particular logical execution flow.

A logical execution flow is distinct from an actual physical flow of execution. It is best illustrated with an example. Consider a server process waiting to service requests from client processes. It is quite conceivable that this server process, upon receipt of a client request, queues this task request in some queue and goes back to waiting for other client service requests. Subsequently a worker process (or thread), associated with or under the control of the server process, consumes work items off this queue and actually does the work that the client process requested. Here, the logical flow of execution is the flow of the task from the client process through the server process to the worker process. Note that the server and worker processes are distinct physical execution flows—the server process queues requests from multiple clients; and the worker process processes requests from multiple clients.

In other words, the class defined by the exemplary execution context infrastructure is a data structure defining a set of data values of defined data types and a set of associated sub-procedures designed to manage and control an execution flow, especially in relationship with the set of data values for defined data types and controlling how the execution flow should proceed An instance of a class generated in accordance with the exemplary execution context infrastructure includes all the logical bits and pieces of data that should be packaged in a one-stop instance. This generated Execution Context is propagated automatically across asynchronous points ("async points").

The exemplary execution context infrastructure provides a straightforward and consistent model for automatic capturing and flowing the Execution Context across async points.

The exemplary execution context infrastructure ensures that the Execution Context associated with a particular execution flow is consistently transferred across runtime-defined async points within a process. If the process is managed, this is ensured via CLR or other similar run-time environment. If the process is not managed, then the exemplary execution context infrastructure provides Application Program Interfaces (APIs) for non-managed processes to capture and transfer its Execution Context across user-defined async points.

An async (or asynchronous) point of execution is a point in a chain of logical execution events where the execution detaches from one physical execution flow and subsequently re-attaches and continues on another (possibly the same as the original or different) physical execution flow. Or it could be a point where the execution pauses and continues at some later point in time. Or it could be a point where the execution breaks out into multiple sub-executions that may or may not execute currently and may complete at different times, the initiator of the sub-executions may or may not wait for all the sub-executions to finish before proceeding with its own main execution. Examples of async points in the CLR include creating new threads of execution, timers that executes a task at a specified time or at regular intervals, overlapped I/O (input/output) requests where the requests for data from disk or network are queued to the Operating System Service and the OS provides a notification when the data requested is available, threadpool requests to create sub-execution tasks that run on different/multiple threads, and registering an event callback where the call-back is notified when a certain event happens. CLR async points include all of the functionality that has async semantics including, for example, Finalizers, Static initializers, ThreadPool APIs, Async Delegates, Timers, etc.

The exemplary execution context infrastructure provides a model for automatic capture and flow the Execution Context across isolation boundaries, such as Appdomain, Process, and machine boundaries. The exemplary execution context infrastructure provides a model to persist the Execution Context and restore it at a later time.

The exemplary execution context infrastructure allows a Host, in a hosted scenario in the runtime environment, to participate and control the flow of Execution Context. This is useful, for example, to enable the Host to flow additional context during async calls, to decide what gets persisted, or what flows across Appdomain, process, or machine boundaries.

A Host could transform individually pieces of the Execution Context (such as security context to a different security context) as appropriate for each scenario. Also, a Host (such as an SQL server uses "Fibers" to represent logical threads of execution instead of physical threads) can decide how the various pieces of the Execution Context gets applied. Also the Host could decide at various control points how the execution itself should proceed based on the contents of the Execution-Context, this includes changing or preventing certain execution flows that would otherwise normally happen.

The exemplary execution context infrastructure provides a simple straightforward model for third parties to participate in the Execution Context model and obtain all the functionality mentioned above. The extensibility model provides appropriate notifications at various points (such as capture, flow across async, Appdomains, process etc., apply, persist, restore etc.) to allow third party extensions to participate actively in the model. This includes deciding and transforming how the various pieces flow across different async points, and in some case even influencing how the execution chain proceeds. For example, the Security Context that is part of the ExecutionContext could trigger a security exception to prevent a certain isolation boundary crossing from happening in the current logical execution.

The exemplary execution context infrastructure provides managed and unmanaged API to explicitly capture, flow the current Execution Context (or the individual pieces of the Execution Context). Other infrastructure pieces (such as networking, windows messaging, etc.) and other applications can use these Execution Context APIs to explicitly capture and flow this information. This allows third parties and other infrastructure pieces to define their own async programming models (that CLR is not aware of) and still participate in the ExecutionContext flow concept for a logical execution.

The exemplary execution context infrastructure provides stack based scoping, that allows multiple Execution Contexts to be pushed and popped on the stack of the same thread. The current Execution Context hides the previous Execution Context that was pushed and the model ensures the Execution Context gets popped automatically when the stack unwinds. When the Execution Context pops the previous Execution Contexts get restored before any other code executes.

The exemplary execution context infrastructure has built-in reliability guarantees (and reliability extensions for other constituent contexts) to ensure the context is pushed and popped reliably when the stack unwinds. For example, Security Context requires this guarantee that when the call unwinds the Security Context gets popped automatically and the previous Security Context restored before any code can execute to guarantee that there are no security holes The exemplary execution context infrastructure provides a model to suppress the flow of the Execution Context. The suppression is also scoped to a stack-frame. The entire Execution Context or the individual pieces of the Execution Context can be suppressed individually. Also provides unmanaged APIs to suppress the flow of the Execution Context or individual pieces (these are not scoped automatically and requires the callers/users to handle the scoping).

ExecutionContext may be associated with items, procedures or Boundaries.

The ExecutionContext model allows specific items to be tied/associated/wrap with an ExecutionContext, these items could be managed CLR instances (or) procedures (or) Boundaries such as Appdomains, Process etc. When the logical execution flows through these items or boundaries, the ExecutionContext model allows these boundaries to handle the appropriate checks before allowing calls through. For example Appdomains could be associated with a default ExecutionContext, and when calls enter the Appdomain a host (or the Appdomain owner/controller) could decide to execute the incoming request using the default ExecutionContext that is attached to the Appdomain (or) use the ExecutionContext that comes with the incoming call (or) a combination of both.

Another example could be in a Windowing UI Framework, each Window could be associated with a default ExecutionContext based on some parameters (potentially at the time the Window is created) and now all messages arriving to the Window could be executed either under this default ExecutionContext that is associated with the Window or with the ExecutionContext that is associated with the incoming message or a combination of both. The model allows the flexibility to let a controller choose the appropriate ExecutionContext to be used for each sub-execution. The choice of which to use will vary based on the scenario under consideration. For example, in some scenarios, it might be appropriate to execute the sub-executions with a new ExecutionContext that is different from the logical execution context that is currently in effect.

The exemplary execution context infrastructure defines a "one-stop" class for all information (and fundamental sub-procedures) relevant to a logical execution flow of computer-executable instructions. The content of this class may be categorized in the following manner:
  Base Execution context
  Security context
  Call context
  Synchronization context
  Other contexts including third party contexts such as
    Localization context, Transaction context, etc.
Security Context The Security Context is part of the larger Execution Context. The Security Context captures all security related information in one package and the exemplary execution context infrastructure consistently captures and transfers with the Execution Context.

This includes all the various security information that is applicable to the current logical thread. For example, this may include a CAS security information (CompressedStack, this carries the identity of the callers on the current stack of execution, the security policy in effect at the time of capture, the permissions granted by the policy for these identities and any privilege elevation or suppression operations performed by any of these identities), an OS Thread token (WindowsIdentity or the identity of the user that is executing this logical chain), an application-defined Principal (for application defined Role based security models), the Host Security Context (when running in a Hosted process where the host flows extra security information) and other third party security information that is applicable for the current execution Hosted scenarios: Security Context automatically works well with the Host and allows the Host to participate and control how the Security context is captured and flowed with the Execution Context.

OS Identity: OS Identity (e.g. WindowsIdentity) is what is used by the ExecutionContext to flow across any impersonation across async points. The application can control if the impersonation flows across the async point or not. The ExecutionContext plays nice with the host by allowing the Host to control how OS thread token is handled. For example, SQL hooks all the OS Identity API and decides how best to handle the OS thread token. For example, when running in Fiber mode SQL has the option of delaying any impersonation till the managed thread calls out into unmanaged code or SQL could let the thread be impersonated and tie the Fiber to this thread.

Trust Boundary Crossing: The security context in the current execution context could get translated or re-interpreted when ever a Trust Boundary is crossed. For example, CLR Appdomains with different Appdomain Policy could be a Trust Boundary within a process, and the Host Appdomain manager could translate the security context or re-interpret the security context based on the Appdomain policies of the current Appdomain and the Appdomains through which the logical thread has passed through. Similarly the Security Context could get translated when the logical thread goes across process/machine boundaries or when persisted. Or the security context could even decide that certain boundary crossing should be disallowed or modified to behave differently. In Hosted scenarios, the Host could influence these transformations or the execution flow based on the current execution's security context.

Call Context

CallContext is a specialized collection object similar to a Thread Local Storage for procedural calls, and provides data slots that are unique to each logical thread of execution. The slots are not shared across call contexts on other logical threads. Objects can be added to the CallContext as it travels down and back up the execution code path, and examined by various objects along the path. The ExecutionContext ensures that the CallContext semantics are maintained by appropriately flowing pieces across different trust boundaries (appdomain boundaries, thread async points, process boundaries). The data in the CallContext could be secured such that only certain procedures or certain users that have the appropriate permissions (rights) can access these data and not others.

Synchronization Context

The goal of the Synchronization Context model is to provide a simple and consistent abstraction that captures the synchronization/async programming models provided by various components (such as WinForms, Avalon, Shell, Indigo, COM STA etc.). This allows a managed application to use a consistent API to talk to different synchronization models/implementations. Also, the current Synchronization Context is available of the current Execution Context, if some procedures need to find out what Synchronization Context they are executing in A highly trusted Synchronization Context implementation is allowed to override the default Wait implementation provided by the CLR for lock, Wait and other managed blocking operations that CLR provides. This allows a custom Synchronization Context to customize the blocking behavior for CLR. For example, the default behavior for CLR is to interoperate well with some native synchronization models, this requires CLR to allow re-entrancy behavior on the physical thread while the logical execution is blocked waiting. (Re-entrancy: while the logical execution is blocked waiting on some event, the physical execution unit might pick up other logical executions that are arriving for processing). This re-entrancy could cause problems for some Hosted scenarios or scenarios that define their own async programming pattern. The Synchronization Context model allows a custom SynchronizationContext to override this default behavior and provide their own blocking and re-entrancy behavior.

Hosted scenarios: When running in a hosted scenarios (such as SQL), the Host can intercept/control the Synchronization Context behavior, including the Wait semantics.

Localization Context and Transaction Context are examples of third party contexts that can participate in the flow of Execution Context.

Localization Context

Localization is the process of customizing an application for a given culture/locale. Localization consists primarily of translating the user interface. The LocalizationContext is intended to provide the localization routines with any data and subroutines they may require to perform the translation. It also serves as an aid to separate localizable resources from application source code. Separating these resources from source code eliminates the need to recompile source code. The localization process refers to translating the application user interface (UI) or adapting graphics for a specific culture/locale. The localization process can also include translating any help content associated with the application.

Transaction Context

The TransactionContext model is used to create a generic transactional object that begins a transaction. By calling the methods of this class, you can compose the work, of possibly multiple objects, in a single transaction and explicitly commit or abort the transaction. A transaction is a unit of work in which a series of operations occur. Resources are not permanently updated unless all operations within the transaction complete successfully. By binding a set of related operations together in a transaction that either completely succeeds or completely fails, error recovery is vastly simplified.

Methodological Implementations

Figure 2:
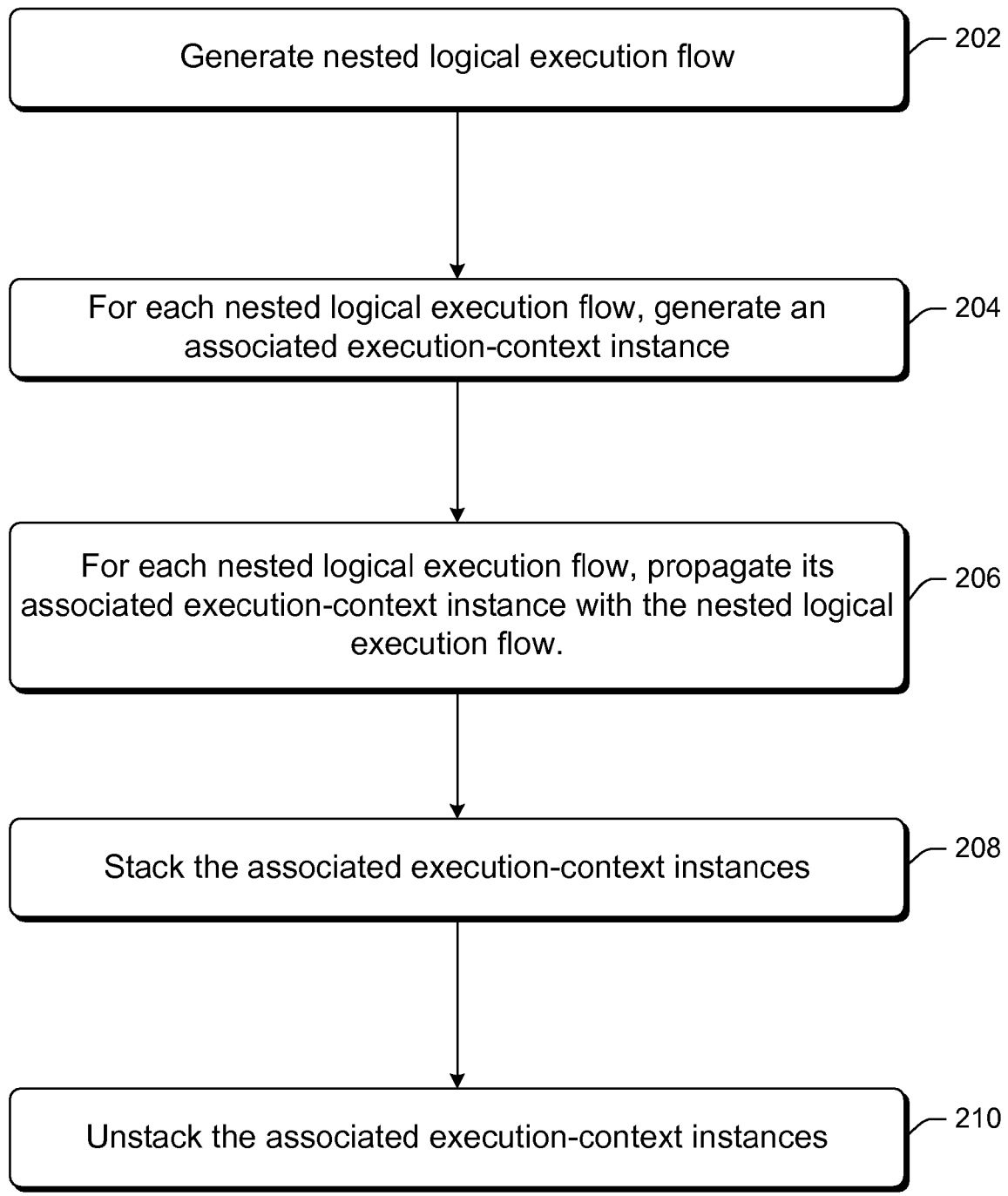
FIG. 2 shows a flow diagram showing a methodological implementation described herein.

FIGS. 1 and 2 show methodological implementations in accordance with the exemplary execution context infrastructure. These methodological implementations may be performed in software, hardware, or a combination thereof. For ease of understanding, the method steps are delineated as separate steps; however, these separately delineated steps should not be construed as necessarily order dependent in their performance.

At 102 of FIG. 1, a computer system implementing the exemplary execution context infrastructure generates an instance of an execution context. This execution-context instance is stored in memory of the computer system.

At 104, the computer system associates the execution-context instance with a particular logical execution flow.

At 106, the computer system propagates the execution-context instance along the particular logical execution flow so that procedures along the associated logical execution flow have access to the set of data without receiving the set of data when the procedures are invoked.

This propagation may include automatically capturing the execution-context instance and transferring it across runtime-defined Common Language Runtime (CLR) asynchronous points. Alternatively, the propagation may include automatically capturing the execution-context instance and transferring one or more individual components of the captured execution-context instance across user-defined asynchronous points.

Also, this propagation may include the transfer of the execution-context instance across Appdomain, process, or machine boundaries.

At 108, the computer system exposes one or more application programming interfaces (APIs) for performing the generating, associating, and propagating so that other program modules may call the one or more APIs. These other program modules (e.g., procedures, routines, applications, etc.) may be managed within a runtime environment or unmanaged.

At 110, the computer system persists the execution-context instance. It may, for example, store the execution-context instance on a secondary storage device (such as hard drive) for use later. When it is needed later, the computer system restores the persisted execution-context instance.

At 202 of FIG. 2, a computer system implementing the exemplary execution context infrastructure generates nested logical execution flows.

For each nested logical execution flows, the computer system generates, at 204, an associated execution-context instance in accordance with acts of blocks 102 and 104 of FIG. 1. It does this so that each execution-context instance is associated with just one of the nested logical execution flows.

For each nested logical execution flows, the computer system propagates, at 206, its associated execution-context instance with it and it does this in accordance with acts of block 106 of FIG. 1.

At 208 of FIG. 2, the computer system stacks the associated execution-context instances in an order that their associated logical execution flows are nested. This stack is a logical organization of data as it is stored and/or accessed in memory.

Later, as the nested logical execution flows unwind, the computer system unstacks, at 210, the execution-context instances in an order that is reverse of that in which their associated logical execution flows were nested.

Common Language Runtime (CLR)

In modern complex computer-program and networking environments, code sharing, scalability, and integration with other cross-platform frameworks are generally highly desired. Use of a runtime by a hosting application (i.e., a "host") generally allows application developers to write managed code with cross-platform compatibility, increased scalability, a common type system, multiple-language support, automatic memory management, and so on. Runtimes include, for example, a Common Language Runtime (CLR), a Java Virtual Machine (VM), and/or the like.

As part of the Microsoft® .NET™ Framework, the Common Language Runtime (CLR) is programming that manages the execution of programs written in any of several supported languages, allowing them to share common object-oriented classes written in any of the languages.

CLR is a cross-platform run-time environment. It compiles multiple languages (including scripting languages) into a binary form known as the Common Intermediate Language (CIL) in a portable execution (PE) file that can then be managed and executed by CLR. This allows optimizations for applications to target multiple platforms. CLR includes the concept of managed versus unmanaged code: Managed code runs under the control of the CLR; unmanaged code does not.

For more information on CLR and its associated terminology, please see and relevant explanatory material found on the MSDN™ Library (msdn.microsoft.com/library/default.asp?url=/library/en-us/cpguide/html/cpconthecommonlanguageruntime.asp).

Exemplary Computing System and Environment

Figure 3:
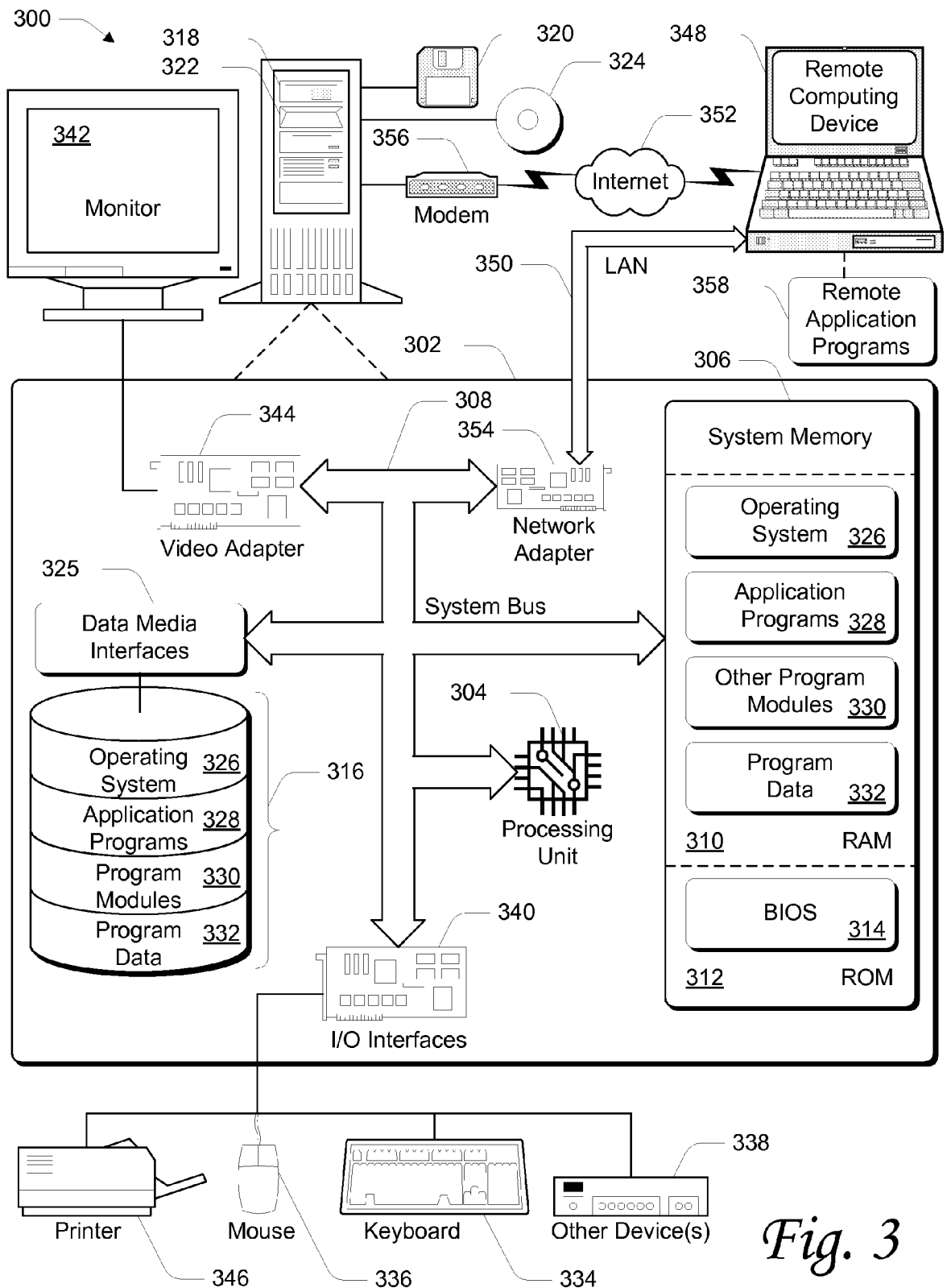
FIG. 3 is an example of a computing operating environment capable of (wholly or partially) implementing at least one embodiment described herein.

FIG. 3 illustrates an example of a suitable computing environment 300 within which an exemplary execution context infrastructure, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary execution context infrastructure may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary execution context infrastructure may be described in the general context of computer-executable instructions, such as program modules, being executed by a computer. Generally, program modules include routines, programs, objects, components, data structures, etc. that perform particular tasks or implement particular abstract data types. The exemplary execution context infrastructure may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, but are not limited to, one or more processors or processing units 304, a system memory 306, and a system bus 308 that couples various system components, including the processor 304, to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 302 typically includes a variety of computer-readable media. Such media may be any available media that is accessible by computer 302 and includes both volatile and non-volatile media, removable and non-removable media.

The system memory 306 includes computer-readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 325. Alternatively, the hard disk drive 316, magnetic disk drive 318, and optical disk drive 322 may be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316 magnetic disk 320, optical disk 324, ROM 312, and/or RAM 310, including, by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components, such as speakers (not shown) and a printer 346, which may be connected to computer 302 via the input/output interfaces 340.

Computer 302 may operate in a networked environment using logical connections to one or more remote computers, such as a remote computing device 348. By way of example, the remote computing device 348 may be a personal computer, a portable computer, a server, a router, a network computer, a peer device or other common network node, and the like. The remote computing device 348 is illustrated as a portable computer that may include many or all of the elements and features described herein, relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet. Such networking environments may be wired or wireless.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted, relative to the computer 302 or portions thereof, may be stored in a remote memory storage device. By way of example, remote application programs 358 reside on a memory device of remote computer 348. For purposes of illustration, application programs and other executable program components, such as the operating system, are illustrated herein as discrete blocks, although it is recognized that such programs and components reside at various times in different storage components of the computing device 302, and are executed by the data processor(s) of the computer.

Computer-Executable Instructions

An implementation of an exemplary execution context infrastructure may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

A program module (or a grouping of computer-executable instructions) may also be called computer-readable program code. A collection of these program modules may be called a computer-program product.

Exemplary Operating Environment

FIG. 3 illustrates an example of a suitable operating environment 300 in which an exemplary execution context infrastructure may be implemented. Specifically, the exemplary execution context infrastructure(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use of functionality of the exemplary execution context infrastructure(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary execution context infrastructure may be stored on or transmitted across some form of computer-readable media (which may also be called computer-usable media). Computer-readable media may be any available media that may be accessed by a computer. By way of example, computer-readable media may comprise, but is not limited to "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

CONCLUSION

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

APPENDIX

Implementation Details

This appendix provides additional details on one exemplary implementation of the exemplary execution context infrastructure. Of course, other implementations would probably have other details.

Execution Context
Class System.Threading.ExecutionContext

```
// this is the interface that all custom context pieces like
// LocalizationContext and TransactionContext could implement
public interface IExecutionContext : IDisposable {
IExecutionContext CaptureContext( );
IExecutionContext CreateCopy( );
void ApplyContext( );
void RevertContext( );
};
[Serializable]
public sealed class ExecutionContext : ISerializable{
public static ExecutionContext Capture( );
[SecurityPermissionAttribute(SecurityAction.LinkDemand,
  Flags=SecurityPermissionFlag.Infrastructure)]
public static void Run(ExecutionContext executionContext,
  ContextCallback callBack, Object state);
public static AsyncFlowControl SuppressFlow( );
public static void RestoreFlow( );
public static bool IsFlowSuppressed( );
public ExecutionContext CreateCopy( );
public void GetObjectData(SerializationInfo info,
  StreamingContext context);
[SecurityPermissionAttribute(SecurityAction.LinkDemand,
  Flags=SecurityPermissionFlag.Infrastructure)]
public static ExecutionContextSwitcher
SetExecutionContext(ExecutionContext executionContext);
}
  public struct ExecutionContextSwitcher : IDisposable {
    void IDisposeable.Dispose( ) { Undo( ); }
    void Undo( );
  };
  public struct AsyncFlowControl: IDisposable {
  public void IDisposable.Dispose( ) { Undo( ); }
        public void Undo( ) { ExecutionContext.RestoreFlow( ); }
  }
  public sealed class Thread {
...
// Property Accessor for ExecutionContext
public ExecutionContext { get;}
}
``` public void GetObjectData(Serializationinfo info, StreamingContext context)

Handles custom serialization across Appdomains (and possibly processes).

public static ExecutionContext Capture( )

Captures the current ExecutionContext, this will also capture all the other logical context data like SecurityContext, SynchronizationContext, TransactionContext, etc. Capture is a heavyweight operation; if you just want to inspect the data on the current execution context, then the use the Thread.ExecutionContext property to get at ExecutionContext on the current thread.

public static AsyncFlowControl SuppressFlow( )

Use this method to Suppress flow of ExecutionContext (and all its constituents) on the current thread on async operations. This method is currently protected with a LinkDemand for Infrastructure Permission. A fully trusted component can call this method to suppress flow for ExecutionContext during following async calls. While SuppressFlow is in effect, ExecutionContext.Capture will return 'null'.

The usage pattern for this API is as follows

```
using (ExecutionContext.SuppressFlow( )) {
    // make some trusted async operations
}
OR
AsyncFlowControl flowControl = ExecutionContext.SuppressFlow( );
  .. // make some trusted async operations
```

```
flowControl.Undo( );
OR
ExecutionContext.SuppressFlow( );
  .. // make some trusted async operations
ExecutionContext.RestoreFlow( );
``` public static void RestoreFlow( )

Use this method to restore flowing the ExecutionContext across async points. This removes the effect of any prior SuppressFlow call.

public static bool IsFlowSuppressed( )

Checks if the flow of Execution Context has been suppressed, this can be used by infrastructure components to decide whether to transfer ExecutionContext during async operations exposed by this infrastructure.

public ExecutionContext CreateCopy( )

Creates a Clone of a captured ExecutionContext, this is useful when a captured ExecutionContext needs to be applied to multiple threads.

public static void Run(ExecutionContext executionContext, ContextCallBack callback, Object state)

Use this method to execute a delegate in the context of the captured ExecutionContext. This method is currently protected with a LinkDemand for Infrastructure Permission. You can't execute multiple callback delegates with the same ExecutionContext (specifically, you cannot use the ExecutionContext that is obtained using Thread.ExecutionContext).

Use CreateCopy to clone the execution context if you want to use the execution context with multiple callbacks.

The usage pattern for this API is as follows
ContextCallBack delegateCallBack=new ContextCallBack(UserCallBack.ExecuteTask);
Execution Context. Run (executionContext, delegateCallBack, state);

The callback will be executed in the context of the ExecutionContext that is passed in. Also see SecurityContext.Run and CompressedStack.Run for details on security implications of this API.

public static ExecutionContextSwitcher SetExecutionContext(ExecutionContext executionContext)

Use this method to set a captured ExecutionContext on the current thread. This method is currently protected with a LinkDemand for Infrastructure Permission. You can't set an ExecutionContext that is already associated with another thread (specifically, you cannot use the ExecutionContext that is obtained using Thread.ExecutionContext).

The 'SetExecutionContext' method returns a value type ExecutionContextSwitcher that automatically calls Undo in its IDispose implementation to restore the previous ExecutionContext.

To help users with this pattern of usage, we will consider introducing a FxCop rule to give out a warning if the 'Set' method is called without a 'using' syntax.

The usage pattern for this API in C# is as follows

```
using (ExecutionContext.SetExecutionContext(executionContext))
{
// .. do some work
};
```

Alternately, one use the below usage pattern as well, if the ExecutionContext needs to be set in one function and reverted in another function. Failure to call Switcher.Undo could result in abnormal behavior. Also Switcher.Undo should be called only on the ExecutionContext

```
ExecutionContextSwitcher switcher =
ExecutionContext.SetExecutionContext(executionContext);
    // .. do some work
    switcher.Undo( );
```

Asynchronous Points within CLR

The runtime will ensure the ExecutionContext (along with the CallContext and the SecurityContext) are propagated consistently across all async points within the process boundary.
 This includes
 Thread.Start( )
 ThreadPool operations
 a. RegisterWaitForSingleObject
 b. QueueUserWorkItem
 c. CreateTimer
 d. Async I/O
 Delegate.BeginInvoke
 Finalization
 Class initializers
 Any remote call
 Other application specific async points like Control.Invoke The full ExecutionContext gets transferred on each of the above methods. This does not include the 'unsafe' APIs in the threadpool and async I/O which retain the V1.1 behavior. i.e. nothing flows across this async points and it is the responsibility of caller to handle the transfer. Unsafe threadpool operations are callable only by FullyTrusted callers and will continue to execute with whatever garbage context has accumulated during prior threadpool operations. It is the callers responsibility to handle the propagation of the Execution-Context.

Thread::Reset removes all traces of the ExecutionContext from the thread.

Note that the effect of this change is that the managed Principal, synchronization, locale and user context, any impersonation etc. will start flowing across async points.

Async Transitions in Unmanaged Code

The ExecutionContext will not get transferred properly on any async operations that happen in the unmanaged code.

The CLR Hosting API should expose APIs that allow unmanaged code to Capture and Propagate CLR Execution-Context on any async operations that happen in unmanaged code.

Security Context
Class System.Security.SecurityContext

In V1 and 1.1, the CLR runtime has a bunch of security related information such as CompressedStack, WindowsIdentity, Managed Principal etc. that are handled and managed independently by different pieces of code. For example, the compressed stack is created and transferred during all safe thread pool and async IO operations. Similarly remoting propagates the Principal on cross App domain calls.

The SecurityContext captures all security related data and propagates them when the ExecutionContext is transferred across async points. The security context can currently be considered to include:
 The compressed stack
 Windows Identity The security context in whidbey is an opaque object that does not have any visible fields or properties. Conceptually it contains a WindowsIdentity and a CompressedStack. To obtain either of these specifically, use other methods such as WindowsIdentity.GetCurrent( ) or CompressedStack.Capture( ).

Going forward, The SecurityContext can expose a richer functionality that is used for performing authorization checks based on different security policies.

The scenarios that are enabled with this richer security context include
 Perform Authorization checks on the SecurityContext directly using either the current Security Policy (or) passing in an arbitrary different security policy.
 treating Appdomains as trust boundaries similar to process/machine boundaries,
  this implies that a cross Appdomain call could be considered as a call that cross trust boundaries where the server domain performs security checks as the calls enter the domain. For example, the security context that flows across appdomains could be evaluated at the AppDomain boundaries using the policy on the server Appdomain.
 Flowing SecurityContext across process boundaries, evaluate the security context
 Persisting SecurityContext for use at a later time, features like reliable messaging want the ability to persist the current SecurityContext in between messages.

```
public struct SecurityContextSwitcher : IDisposable {
    void IDisposable.Dispose( ) { Undo( ); }
    void Undo( );
};
public sealed class SecurityContext : ICloneable {
  public static SecurityContext Capture( );
    [SecurityPermissionAttribute(SecurityAction.LinkDemand,
    Flags = SecurityPermissionFlag.Infrastructure)]
  public static void Run(SecurityContext securityContext,
    ContextCallback callBack, Object state);
        public static AsyncFlowControl SuppressFlow( );
        public static void RestoreFlow( );
        public static bool IsFlowSuppresed( );
  public SecurityContext CreateCopy( );
    [SecurityPermissionAttribute(SecurityAction.LinkDemand,
    Flags = SecurityPermissionFlag.Infrastructure)]
        public static SecurityContextSwitcher
    SetSecurityContext(SecurityContext securityContext);
        }
``` public static SecurityContext Capture( );
 Static helper to capture the current SecurityContext that can applied on another thread. ExecutionContext.Capture implicitly calls this to capture the SecurityContext.
public static AsyncFlowControl SuppressFlow( )
 Use this method to Suppress flow of SecurityContext (and all its constituents) on the current thread on async operations. This method is currently protected with a LinkDemand for Infrastructure Permission. A fully trusted component can call this method to suppress flow for SecurityContext during following async calls. While SuppressFlow is in effect, SecurityContext.Capture will return 'null'.
 The usage pattern for this API is as follows

```
using (SecurityContext.SuppressFlow( )) {
    // make some trusted async operations
}
OR
AsyncFlowControl flowControl = SecurityContext.SuppressFlow( );
  .. // make some trusted async operations
  flowControl.Undo( );
```

```
        OR
SecurityContext.SuppressFlow( );
    .. // make some trusted async operations
    SecurityContext.RestoreFlow( );
``` public static void RestoreFlow( )

Use this method to restore flowing the SecurityContext across async points. This removes the effect of any prior SuppressFlow call.

public static bool IsFlowSuppressed( )

Checks if the flow of SecurityContext has been suppressed, this can be used by infrastructure components to decide whether to transfer SecurityContext during async operations exposed by this infrastructure.

public SecurityContext CreateCopy( )

Creates a Clone of a captured SecurityContext, this is useful when a captured SecurityContext needs to be applied to multiple threads.

public static void Run(SecurityContext securityContext, ContextCallback callback, Object state)

Use this method to execute a delegate in the context of a captured SecurityContext. This method is currently protected with a LinkDemand for Infrastructure Permission. You can't execute multiple callback delegates with the same SecurityContext (specifically, you cannot use the SecurityContext that is obtained using Thread. Execution Context. SecurityContext).

Use CreateCopy to clone the SecurityContext if you want to use the SecurityContext with multiple callbacks.

The usage pattern for this API is as follows

ContextCallBack delegateCallBack=new ContextCallBack(UserCallBack.ExecuteTask);

SecurityContext. Run(securityContext, delegateCallBack, state);

The callback will be executed in the context of the SecurityContext that is passed in. Also see CompressedStack.Run for details on security implications of this API. This means if the SecurityContext contains a WindowsIdentity, then it is used for impersonating the thread for the duration of the call-back. All CLR security stack-walks stop when they hit this Run method and any compressed stack captured in the SecurityContext is used for further evaluation of Demands. (Also see CompressedStack.Run).

public static SecurityContextSwitcher SetSecurityContext (SecurityContext securitycontext);

Static helper to set the SecurityContext on the current thread. This method is protected with a LinkDemand for Infrastructure Permission.

The SetSecurityContext( ) method must be coupled with a call to Switcher.Undo( ) in the same function which will undo the effect of a SetSecurityContext( ). Calling Switcher.Undo from a different function will cause an exception. Typically the usage must be as follows:

```
using (SecurityContext.SetSecurityContext(newSC))
{
// Do some work with the new context
};
    Or
    SecurityContextSwitcher         switcher        =
SecurityContext.SetSecurityContext(newSC);
        // .. do some work
        switcher.Undo( );
```

The 'SetSecurityContext' method returns a value type SecurityContextSwitcher that automatically restores the security context method in its IDispose implementation.

To help users with this pattern of usage, CLR will introduce a FxCop rule to give out a warning if the 'Set' method is called without a 'using' syntax.

CompressedStack

The System.Security.CompressedStack class provides a managed API to capture and set the CompressedStack.

The SecurityContext.Capture method captures the current CompressedStack as part of the current security context.

The CompressedStack conceptually captures the Evidence of all the assemblies in the call stack, including any stack modifiers such as Assert/Deny/PermitOnly.

In Whidbey, the CompressedStack is an opaque object that exposes a few public methods to capture and apply the compressed stack.

```
    public struct CompressedStackSwitcher : IDisposable {
        void IDisposeable.Dispose( ) { Undo( ); }
        void Undo( );
    };
    public sealed class CompressedStack: ICloneable {
    public static CompressedStack Capture( );
    [SecurityPermissionAttribute(SecurityAction.LinkDemand,
        Flags = SecurityPermissionFlag.Infrastructure)]
    )SetCompressedStack(CompressedStack securityContext);
    [SecurityPermissionAttribute(SecurityAction.LinkDemand,
        Flags      =      SecurityPermissionFlag.Infrastructure)]
            public   static   CompressedStackSwitcher    void
    Run(CompressedStack compressedStack, ContextCallback
    callBack, Object state
        }
``` public static CompressedStack Capture( );

Static helper to capture the compressed stack for the current thread.

public SecurityContext CreateCopy( )

Creates a Clone of a captured compressed stack, this is useful when a captured CompressedStack need to be applied to multiple threads.

public static void Run(CompressedStack context, ContextCallBack callback, Object state)

Use this method to execute a delegate in the context of a captured CompressedStack. This method is currently protected with a LinkDemand for Infrastructure Permission.

The usage pattern for this API is as follows

ContextCallBack delegateCallBack=new ContextCallBack(UserCallBack.ExecuteTask);

CompressedStack.Run(compressedStack, delegateCallBack, state);

The callback will be executed in the context of the compressed stack that is passed in. CAS security walks always stop when they hit the Run method and proceed to evaluate the compressed stack that is passed to this Run method.

public static CompressedStackSwitcher SetCompressedStack(CompressedStack compressedStack);

Static helper to set compressed stack on the current thread. This method is protected with a LinkDemand for Infrastructure Permission.

The Set( ) method must be coupled with a call to Switcher.Undo( ) in the same function which will undo the effect of a Set( ). Calling Switcher.Undo from a different function will cause an exception. Typically the usage must be as follows:

```
using (CompressedStack.Set(newCompressedStack))
{
// Do some work with the new context
};
    Or
CompressedStackSwitcher         switcher        =
CompressedStack.Set(newCompressedStack);
        // .. do some work
        switcher.Undo( );
```

The 'Set' method returns a value type CompressedStack-Switcher that automatically undoes the effect on the Set in its IDispose implementation.

To help users with this pattern of usage, CLR will introduce a FxCop rule to give out a warning if the 'Set' method is called without a 'using' syntax.

WindowsIdentity and Impersonation

1. Windowsidentity

The System.Principal.WindowsIdentity class provides a managed API to access and manipulate the OS thread Token.

The SecurityContext.Capture method captures the current WindowsIdentity as part of the current security context. The WindowsIdentity class is used to represent the OS (user) Identity for the current execution.

2. Impersonation

WindowsIdentity class provides managed API for handling impersonation.

As specified above the WindowsIdentity gets captured as part of the Security Context and is propagated across async points.

SecurityContext.Set and SecurityContext.Run methods will call the impersonation API to impersonate the new thread. But the difficulty is that, in async scenarios, the appropriate impersonation context may be unavailable because the client has logged out with the original thread before the completion can be serviced. If the impersonation fails because the user has logged out on the thread that initiated the call, we should fail the threadpool operation.

Impersonation is an expensive operation, so we should choose where it is appropriate to do impersonation and provide other Unsafe APIs that allows trusted methods to handle this themselves.

WindowsIdentity.Impersonate is the recommended way to impersonate an Identity. WindowsIdentity.Impersonate returns a WindowsImpersonationContext. WindowsImpersonationContext.Undo is the recommended way to Undo an impersonation.

In presence of SQL Hosting the WindowsIdentity API will behave appropriately and delegate all impersonation APIs to the host, this ensure that the impersonation APIs work correctly under Fiber mode.

SQL Hosting

In SQL/CLR hosting the managed Thread object is tied to a fiber rather than the physical thread. SQL Server manages and schedules these fibers. When ever a fiber blocks waiting for an event or a lock, SQL will swap the fiber out and use the physical thread to schedule a different fiber.

Given that in CLR, GC can happen between any two managed instructions; this causes the logical thread to block for GC to finish. When the logical thread resumes, it could be running on a completely different physical thread.

CLR uses the following Win32 APIs within the WindowsIdentity and the WindowsImpersonation class to support Impersonation requests in managed code.

GetThreadToken
Impersonate
SetThreadToken
RevertToSelf APIs.

In a non hosted scenario methods that require proper impersonation to happen when calling Win32 or other P/Invoke calls would use something like below.

```
// get the identity for the logical thread (from current SecurityContext)
// calls into the host if needed
    WindowsIdentity windowsIdentity = WindowsIdentiy.GetCurrent( );
    // make sure the physical thread is impersonated
    // passes this request on to the host
    using (windowsIdentity.Impersonate( ))
    {
.... do some work..
make some P/Invoke calls // host handles impersonation at the boundaries
impContext.Undo( ); // revert the impersonation
    }
```

As specified above the physical thread could be switched between any 2 managed instructions when running inside SQL. So it doesn't make sense for the runtime to call into the Win32 APIs and modify the physical thread tokens.

So when running inside SQL to ensure the semantics of the above code is preserved, the runtime should route the above APIs to the SQLHost. The SQLHost can cache the token in the fiber's execution context.

CLR notifies the host whenever the logical threads transition between managed and unmanaged code. This is a safe place for the physical thread to be impersonated with the OS thread token that is cached in the ExecutionContext. This allows SQL Server to preserve the behavior expected by the managed method.

SynchronizationContext

Currently there are number of asynchronous programming models introduced by various parts of the framework. WinForms has an asynch model that is based on Window messaging (Control.Invoke, BeginInvoke). The new Avalon UI Framework is introducing its own model and potentially Indigo web-services messaging framework is introducing its own. This leads to a proliferation of APIs to do asynchronous programming.

The user code is currently required to understand the specifics of various async APIs (like Control.Invoke for WinForms) to ensure that their code runs in the correct synchronization environment (window thread).

The goal of the Synchronization context model is to provide a simple and consistent abstraction that captures the synchronization/async programming models provided by various components, such as WinForms, Avalon, Shell, Indigo, COM STA etc.

Also the model allows custom SynchronizationContexts to provide their own custom Wait implementation to customize the blocking behavior for CLR operations such as Lock, Wait etc.

Async Programming Models

WinForms

The Windows GUI programming model (provided by WinForms) is based on a thread-affinity model which attaches a window to a single thread. All calls to the window needs to be dispatched to that thread for execution, the Win32 APIs SendMessage and PostMessage are used to deliver messages to the queues associated with the Window. The Thread that is associated with the window is usually in a message pump loop that picks up messages from the queues and dispatches them to appropriate callback functions.

An artifact of this GUI programming model is that all code running as part of the GUI control needs to run on the Thread that is associated with the Window. COM introduced the STA (Single Threaded Apartment) model to allow COM components to play nice with the Window thread affinity requirement. In the managed world WinForms provides managed classes for GUI programming, but they still require/depend on the underlying Window Thread Affinity for correctness. So currently managed code running as part of WinForms Control is required to run on the Control's thread.

This implies if this code makes any asynchronous calls (like the managed ThreadPool::QueueUserWorkItem or async Overlapped I/O APIs), that cause the execution of the callbacks to run on a different thread, then there needs to be a way to get back to Window's thread to perform UI operations on the Control.

WinForms hides the complexity of this switchback in their Control.Invoke and Control.BeginInvoke methods. Control.Invoke is used for a synchronous call, and uses SendMessage for cross thread communication and Control.BeginInvoke is used for asynchronous calls and uses PostMessage for cross thread (could be same thread as well) communication.

Any Code that wants to talk to a Control has to use one of these APIs to talk back to the control.

Avalon

Avalon is providing its own set of APIs to dispatch messages to Avalon GUI contexts. Avalon uses a rental model and doesn't require thread affinity, so any thread can use a window. However, the thread must still exclusively rent the UI context containing the window, to handle the messages for the window.

Other Synchronization Environments

Indigo messaging and transactions etc. are also defining their own synchronization models and asynchronous programming models as well.

Async model in Asp.Net, ASP.Net HttpContext can also be considered as a part of the ExecutionContext (see the details below on ExecutionContext). The async programming model in ASP.Net could also take advantage of the SynchronizationContext model.

Class Definition

CLR provides a default SynchronizationContext class, this is a free threaded context with no synchronization.

Providers of the different Synchronization models could extend this class and provide their own implementations for these methods.

```
public struct SynchronizationContextSwitcher : IDisposable {
public void IDisposable.Dispose( ) { Undo( ); }
        public void Undo( );
}
    public Object SendDelegate(Object state);
    public Object SendOrPostDelegate(Object state);
    public void SendOrPostDelegate(Object state);
    public class SynchronizationContext {
// enter synchronization context and perform a synchronous invoke
    public virtual Object Send(SendDelegate d, Object state) {
            return d(state);
}
// enter synchronization context and perform an asynchronous invoke
    public virtual void Post(PostDelegate d, Object state) {
            // use the threadpool API to create a async work request
            // map the PostDelegate to WaitCallBack delegate w
            Threadpool.QueueUserWorkItem(w, state);
}
    // set SynchronizationContext on the current thread
    protected    static    SynchronizationContextSwitcher
SetSynchronizationContext(SynchronizationContext syncContext);
    // Get the current SynchronizationContext on the current thread
    public static SynchronizationContext GetCurrent( );
    // helper to Clone this SynchronizationContext,
    public SynchronizationContext CreateCopy( );
    // Customization hooks for CLR Wait operations
    [CLSCompliant(false)]
    [SecurityPermissionAttribute(SecurityAction.LinkDemand,           Flags
=SecurityPermissionFlag.ControlPolicy|SecurityPermissionFlag.ControlEvidence)]
    public virtual int Wait(IntPtr[ ] waitHandles, bool waitAll, int millisecondsTimeout) {
    return WaitHelper(waitHandles, waitAll, millisecondsTimeout);
}
    // Static helper to which the above method can delegate to in order to get the
default
    // COM behavior.
    [CLSCompliant(false)]
    [MethodImplAttribute(MethodImplOptions.InternalCall)]
    [SecurityPermissionAttribute(SecurityAction.LinkDemand,           Flags
=SecurityPermissionFlag.ControlPolicy|SecurityPermissionFlag.ControlEvidence)]
    protected static extern int WaitHelper(IntPtr[ ] waitHandles, bool waitAll, int
millisecondsTimeout);
    // Method called when the CLR does a wait operation
    [CLSCompliant(false)]
    [SecurityPermissionAttribute(SecurityAction.LinkDemand,           Flags
=SecurityPermissionFlag.ControlPolicy|SecurityPermissionFlag.ControlEvidence)]
    public virtual int SignalAndWait(IntPtr[ ] waitHandles, int millisecondsTimeout) {
    return SignalAndWaitHelper(waitHandles, millisecondsTimeout);
}
    // Static helper to which the above method can delegate to in order to get the
default
    // COM behavior.
    [CLSCompliant(false)]
```

-continued

```
[MethodImplAttribute(MethodImplOptions.InternalCall)]
[SecurityPermissionAttribute(SecurityAction.LinkDemand,          Flags
=SecurityPermissionFlag.ControlPolicy|SecurityPermissionFlag.ControlEvidence)]
    protected static extern int SignalAndWaitHelper(IntPtr[ ] waitHandles, int
millisecondsTimeout);
    };
```

Method Descriptions

SynchronizationContext.Post method is used for dispatching an asynchronous message into a Synchronization context.

SynchronizationContext.Send method is used for dispatching a synchronous message (i.e. non async mode) into a Synchronization context.

SynchronizationContext.SetSynchronizationContext: is used to set a SynchronizationContext on the current thread, this returns a switcher object which can be used to Undo the set operation. This is a protected static method and should be only used by the SynchronizationContext implementations to set their SynchronizationContext as the current SynchronizationContext. Usually this is done as part of their Send, Post implementations to switch the current SynchronizationContext.

SynchronizationContext.GetCurrent: is used to get the current SynchronizationContext on the current thread.

SynchronizationContext.Wait and related methods:

Currently the CLR infrastructure ensures that it plays nice with the COM STA model. Currently any thread that is marked with an STA attribute gets initialized to STA at startup. A thread running managed code could be in STA because of other reasons as well (for example a COM STA thread could wander into managed code, or managed code could result in a call to CoInitialize of STA).

CLR exposes different ways to cause a Wait in managed code, this includes lock(Object), calling Wait on Event handles, Thread.Suspend etc. If the current thread is in an STA, CLR behaves as a good citizen and calls CoWaitForMultipleHandles (or its equivalent) to let COM handle the STA specific wait semantic.

Currently there is an Avalon request to allow these Wait operations to be delegated to their Synchronization environment, so that they can handle the Wait appropriately. For example, Avalon doesn't want to allow any re-entrancy, this is change in philosophy from the WinForms model which allowed full re-entrancy for compatibility and to avoid deadlocks. eHome can take advantage of this feature as well to provide appropriate re-entrancy behavior. It is very likely there will other requests for this support.

SynchronizationContext.Wait: This method is meant to allow the implementers to participate and influence the Wait operation. For example, WinForms might want to choose whether the wait needs to pump GUI messages as well. If this method is not overridden, CLR will fall back to the current existing behavior.

SynchronizationContext.WaitHelper: this method exposes the CLR internal implementation for handling Wait. The expected behavior is for the above virtual method to call this static method passing in appropriate flags to control and participate in the Wait operation. Within this static method CLR handles its internal Alerts, and if running inside a Host (like SQL) CLR will also delegate wait requests to the host.

CLR will delegate Thread.DoAppropriateWait operations to a managed SynchronizationContext instance, the act of delegation should not trigger another call to Thread.DoAppropriateWait, otherwise we could end up with a recursion.

Some of the cases currently within CLR that could trigger a Wait include, a) Security system currently takes locks; this means any Demand could trigger waits. But it is possible to make the LinkDemand checks on fully trusted assemblies succeed without blocking. This will cover P/Invoke APIs which require LinkDemand for UnmanagedCode.

b) Loader trying to load a class or fusion downloading an assembly for Load. I didn't see any calls to DoAppropriateWait from the Loader code or the fusion code, so these locks may not cause re-entrancy issues (but I will verify).

c) Others??

So we probably want Synchronization.Wait implementation to have some restrictions similar to our reliability rules to ensure that the act of calling this method from CLR doesn't cause re-entrancy issues.

SynchronizationContext.SignalAndWait

SynchronizationContext.SignalAndWaitHelper

These are additional variations of the wait APIS.

A Sample implementation of SynchronizationContext

WinForms, Avalon, Shell, Indigo and others who want to define their own semantics provide their own implementations that hide their specific details.

In all the methods, the synchronization context handles the behavior needed to enforce its synchronization model. In addition to this, CLR adds a couple of requirements on Synchronization contexts for managing the SecurityContext.

Additional Requirements a) If the implementation of any of the above methods requires a thread switch, the method should capture the ExecutionContext on the current thread and apply it on the new Thread before dispatching the call. The ExecutionContext includes the SecurityContext, CallContext and other information that needs to flow with the logical thread.

b) If the implementation causes only an async operation on the same thread (PostMessage to self), then the method can just capture only the SecurityContext for the current thread and apply it before dispatching the actual call. The SecurityContext includes the CAS security information which represents the assemblies on the call stack when the async operation was initialized.

Below is a sample definition of a WindowsSynchronizationContext that provides an implementation of the SynchronizationContext that is based on Win32 window messaging.

```
public class WindowsSynchronizationContext : SynchronizationContext {
    Thread thread;
    Window window;
```

-continued

```
    // enter synchronization context and perform a non-asynchronous invoke
    public override Object Send(SendDelegate d, Object state) {
            Object o;
        if (Thread.CurrentThread == thread) {
            o = SendDelegate(state);
        } else {
            e = ExecutionContext.Capture( );
            // Send a message to the window,
            // when the message is picked up, MyCallBack function gets called
            // details omitted
        // the equivalent of Control.Invoke
            o    =    Win32.Send(window,              new
SendOrPostDelegate(WindowsSynchronizationContext.MyCallBack), d, state, e);
        }
            return o;
    }
        // enter synchronization context and perform an asynchronous invoke
        public override void Post (PostDelegate d, Object stae) {
    if (currentThread == t) {
        // we want to capture only the SecurityContext here
    s = SecurityContext.Capture( );
    // Post a message to the window,
    // when the message is picked up, MyCallBack function gets called
    // details omitted
    // the equivalent of Control.BeginInvoke
    Win32.Post(window,                              new
SendOrPostDelegate(WindowsSynchronizationContext.MyCallBack), d, state, s);
    }
    else {
    e = ExecutionContext.Capture( );
    // Post a message to the window,
    // when the message is picked up, MyCallBack function gets called
    // details omitted
    Win32.Post(window,                              new
SendOrPostDelegate(WindowsSynchronizationContext.MyCallBack), d, state, e); }
        }
        // helper that setups the ExecutionContext and dispatches the call
        internal static Object MyCallBack(SendOrPostDelegate d, Object state,
ExecutionContext e) {
    // push ExecutionContext on the thread
    using (ExecutionContext.SetExecutionContext(e)) {
      return d(state);
    }
        }
        // helper that setups the SecurityContext and dispatches the call
        internal static void MyCallBack(SendOrPostDelegate d, Object state,
SecurityContext s) {
    // push security context on the thread
    using (SecurityContext.SetSecurityContext(s)) {
        d(state); }
        }
    }
```

COM STA SynchronizationContext

In general it will be useful to expose our COM specific magic that CLR does internally, through the SynchronizationContext implementation.

CLR could provide an implementation of SynchronizationContext for COM STA. So any thread that is marked with an STA attribute could start of with a COMSynchronizationContext that represents the STA, we could leverage our current implementation to build this COMSTASynchronizationContext.

This provides a clean model where any async ThreadPool operation initiated on the STA thread, the callbacks will automatically happen on the STA thread. Currently, the callbacks will happen on the thread pool thread and if the callbacks talk to a COM component in the STA, all the calls will get marshaled (some of these will even fail).

There are other Synchronization models that were described above and in all these cases, it is the responsibility of the implementer of the Synchronization Context to properly transfer the ExecutionContext (or just the SecurityContext, if there is no thread switch) across the async operation.

Class HostExecutionContext

The HostExecutionContextManager class allows a CLR Host to participate in the flow of ExecutionContext. For example, in SQL/CLR, SQL wants the ability to participate in the capture and flow of ExecutionContext. Specifically they want the ability to flow their Host specify context data (security data) to be captured and propagated when the ExecutionContext is captured and flowed.

```
public class HostExecutionContextManager
{
    // capture Host SecurityContext
    public virtual HostExecutionContext Capture( );
    // Set Host SecurityContext
    public virtual void SetHostExecutionContext(HostExecutionContext
hostExecutionContext);
    public virtual void Revert( );
};
public class HostExecutionContext: IDisposable
{
```

-continued

```
    virtual void Dispose( ){ }
}
public class AppDomainManager
{
    ...
    public virtual HostExecutionContextManager
    GetHostExecutionContextManager( );
}
```

The AppDomainManager class provides an extensibility point for CLR Hosts to participate in the AppDomain creation and influence various execution pieces in CLR.

If the current AppDomainManager provides a HostExecutionContextManager, then CLR call into this manager every time ExecutionContext.Capture or ExecutionContext.Set or ExecutionContext.Revert happens to allow for the Host to participate in the flow.

Class CallContext

The CallContext provides functionality similar to a Thread Local Storage for logical calls, i.e. data slots that are unique to each logical thread of execution. The slots are not shared across call contexts on other logical threads. Objects can be added to the CallContext as it travels down and back up the execution code path, and examined by various objects along the path.

The actual store for the CallContext data is in the ExecutionContext and hence flows wherever the ExecutionContext flows. The CallContext class exposes static API to access this data. The CallContext is the extensibility point for applications and managed services to propagate additional information with the ExecutionContext. The managed services should store implement the IExecutionContext interface and store their data in the CallContext.

When ExecutionContext is captured across async points, data in the CallContext is copied over to the captured ExecutionContext. Objects that implement IExecutionContext are handled as follows
  (i) During ExecutionContext.Capture, IExecutionContext.Capture is called to allow for the service to handle the capture operation and provide a captured instance that implements IExecutionContext to flow.
  (ii) When the captured ExecutionContext is 'Set' on the new Thread, the IExecutionContext.Apply is called on the captured CallContext data.
  (iii) When ExecutionContext is reverted, the IExecutionContext.Revert is called on the applied CallContext data
  (iv) When ExecutionContext.CreateCopy is called on a captured ExecutionContext, IExecutionContext.CreateCopy is called on captured CallContext data.

See the samples section for a sample of a custom HostThreadContext and how it flows with the ExecutionContext.

Contexts Associated with Managed Object Instances

The ExecutionContext model allows managed object instances to be tied/associated/wrap with an ExecutionContext, the managed instance can handle the appropriate checks before allowing calls through. For example Appdomains could be associated with a default ExecutionContext, and when calls enter the Appdomain a host (or the Appdomain owner/controller) could decide to execute the incoming request using the default ExecutionContext associated with the Appdomain (or) the ExecutionContext that comes with the incoming call (or) a combination of both.

Another example could be in a Windowing UI Framework, each Window could be associated with a default ExecutionContext based on some parameters and now all messages arriving to the Window could be executed either under this default ExecutionContext associated with the Window or with the ExecutionContext that is associated with the incoming message or a combination of both.

The model allows the flexibility to let a controller choose the appropriate ExecutionContext to be used for each sub-execution.

The invention claimed is:

1. A computer-program product comprising one or more computer-usable storage media having computer-readable program code embodied therein, the computer-readable program code configured to be executed to implement a method for facilitating an execution-context infrastructure, said method comprising:
   generating an instance of an execution context, the instance of an execution context comprising an ambient set of data configured for association with a particular logical execution flow so that procedures along an associated logical execution flow have access to the set of data without receiving the set of data when the procedures are invoked;
   associating the execution-context instance with the particular logical execution flow;
   propagating the execution-context instance along with the particular logical execution flow so that procedures along the associated logical execution flow have access to the set of data without receiving the set of data when the procedures are invoked.

2. A computer-program product as recited in claim 1, wherein the execution-context instance further comprises an ambient set of procedures facilitating management of the particular logical execution flow.

3. A computer-program product as recited in claim 1, wherein the propagating comprises transferring the execution-context instance across runtime-defined Common Language Runtime (CLR) asynchronous points.

4. A computer-program product as recited in claim 1, wherein the propagating comprises automatically capturing the execution-context instance and transferring the captured execution-context instance across asynchronous points.

5. A computer-program product as recited in claim 1, wherein the propagating comprises automatically capturing the execution-context instance and transferring the captured execution-context instance across runtime-defined Common Language Runtime (CLR) asynchronous points.

6. A computer-program product as recited in claim 1, wherein the propagating comprises automatically capturing the execution-context instance and transferring one or more individual components of the captured execution-context instance across user-defined asynchronous points.

7. A computer-program product as recited in claim 1, wherein the propagating comprises automatically capturing the execution-context instance and suppressing one or more individual components of the captured execution-context instance across user-defined asynchronous points.

8. A computer-program product as recited in claim 1, wherein the propagating comprises transferring the execution-context instance across Appdomain, process, machine boundaries or other user defined boundaries.

9. A computer-program product as recited in claim 1, further comprising exposing one or more application programming interfaces (APIs) for performing the generating, associating, and propagating so that other program modules may call the one or more APIs.

10. A computer-program product as recited in claim 1, further comprising exposing, to program modules managed within a run-time environment, one or more application programming interfaces (APIs) for performing the generating, associating, and propagating so that other program modules may call the one or more APIs.

11. A computer-program product as recited in claim 1, further comprising exposing, to program modules that are not managed within a run-time environment, one or more application programming interfaces (APIs) for performing the generating, associating, and propagating so that other program modules may call the one or more APIs.

12. A computer-program product as recited in claim 1, wherein the execution-context instance facilitates security functionality of the particular logical execution flow, wherein the security functionality is selected from a group consisting of:
    allowing a host in a managed runtime environment to participate and control the security functionality;
    identifying of hardware or software related to the particular logical execution flow;
    defining security policies for the particular logical execution flow;
    translating security policies when crossing logically defined trust boundaries in a managed runtime environment.

13. A computer-program product as recited in claim 1, wherein the execution-context instance facilitates synchronization functionality of the particular logical execution flow in a managed runtime environment.

14. A computer-program product as recited in claim 1, wherein, from the perspective of the particular logical execution flow, its associated execution-context instance is configured to facilitate replacement of a defined synchronization context model in a managed runtime environment with a new synchronization context model.

15. A computer-program product as recited in claim 1, wherein the execution-context instance facilitates transaction functionality of the particular logical execution flow.

16. A computer-program product as recited in claim 1, further comprising:
    generating nested logical execution flows;
    for each nested logical execution flow, repeating the generating, associating, and propagating acts so that each execution-context instance is associated with just one of the nested logical execution flows;
    stacking the execution-context instances in an order that their associated logical execution flows are nested;
    as the nested logical execution flows unwind, unstacking the execution-context instances in an order that is reverse of that in which their associated logical execution flows were nested.

17. A computer-program product as recited in claim 1, in a runtime environment with a host, further comprising allowing the host to participate and control in the generation and propagation of the execution-context instance.

18. A computer-program product comprising one or more computer-usable storage media having computer-readable program code embodied therein, the computer-readable program code configured to be executed to implement a method for facilitating an execution-context infrastructure, said method comprising:
    generating nested logical execution flows;
    for each nested logical execution flow, generating an instance of an execution context, the instance of an execution context comprising an ambient set of data configured for association with a particular logical execution flow so that procedures along an associated logical execution flow have access to the set of data without receiving the set of data when the procedures are invoked;
    for each nested logical execution flow, associating the execution-context instance with the particular logical execution flow;
    for each nested logical execution flow, propagating the execution-context instance along with the particular logical execution flow so that procedures along the associated logical execution flow have access to the set of data without receiving the set of data when the procedures are invoked;
    stacking the execution-context instances in an order that their associated logical execution flows are nested.

19. One or more computer-readable media as recited in claim 18, further comprising, as the nested logical execution flows unwind, unstacking the execution-context instances in an order that is reverse of that in which their associated logical execution flows were nested.

20. A computer-program product comprising one or more computer-usable storage media having computer-readable program code embodied therein, the computer-readable program code configured to be executed to implement a method for facilitating an execution-context infrastructure, said method comprising:
    generating an instance of an execution context, the instance of an execution context comprising an ambient set of data configured for association with a particular logical execution flow so that procedures along an associated logical execution flow have access to the set of data without receiving the set of data when the procedures are invoked;
    associating the execution-context instance with the particular logical execution flow;
    propagating the execution-context instance along with the particular logical execution flow so that procedures along the associated logical execution flow have access to the set of data without receiving the set of data when the procedures are invoked, wherein the propagating comprises transferring the execution-context instance across asynchronous points.

* * * * *